J. C. Hursell,
Dovetailing Machine.

No. 67,654.      Patented Aug. 13, 1867.

Witnesses.
Chas. H. Griffin
C. W. Baldwin

Inventor.
John C. Hursell.
by his attorney.
Frederick Curtis

United States Patent Office.

JOHN C. HURSELL, OF BOSTON, MASSACHUSETTS.

Letters Patent No. 67,654, dated August 13, 1867.

IMPROVEMENT IN DOVE-TAIL CUTTERS.

*The Schedule referred to in these Letters Patent and making part of the same.*

TO ALL TO WHOM THESE PRESENTS SHALL COME:

Be it known that I, JOHN C. HURSELL, of Boston, in the county of Suffolk, and State of Massachusetts, have invented a new and useful Improvement in Cutters for Dove-Tailing Machinery; and do hereby declare the following to be a full, clear, and exact description thereof, due reference being had to the accompanying drawings, making part of this specification, and in which—

Figure 1:
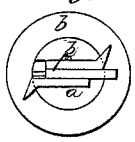
Figure 2:
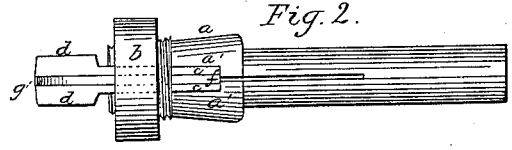
Figure 3:
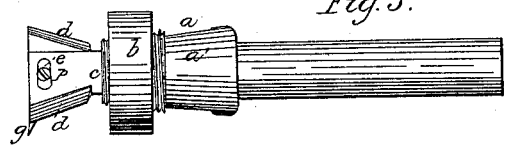
Figure 4:
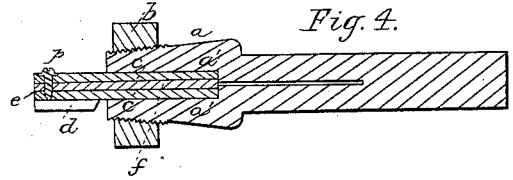
Figure 5:
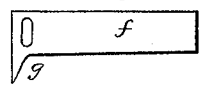

Figure 1 is an end view,
Figure 2 a side elevation,
Figure 3 an edge elevation, and
Figure 4 a longitudinal section of my invention.
Figure 5 is a representation of the pointer-plate to be described.

The object of the invention is to so construct the cutter of a dove-tailing machine that the mortises cut by it shall be always of an equal and uniform size and taper.

The invention consists in the peculiar combination and arrangement of two cutters in such manner as to enable their cutting edges to be maintained at the same distance apart as they become worn, the invention further consisting in combining with the cutters a scoring-point or pointer-plate, as hereinafter described.

In the above-mentioned drawings, illustrating my invention, and which exhibit one of a "gang" of cutters employed in a machine for cutting dove-tailed joints, the cutter-stock or clamp is shown as composed of a tapering furcated spindle, $a$, having a screw-thread cut upon its outer extremity to receive an encompassing ring, $b$, which is screwed upon it, the cutters being enclosed between the jaws $a'$ $a'$ of the stock, which is then to be inserted in the "arbor" of the machine in the usual manner.

The above-described clamp is in general form similar to the ordinary drill-chuck now in common use, and forms no part of my invention.

The cutter is shown as composed of two twin cutting-plates $c$ $c$, having inclined bevelled cutters or cutting edges $d$ $d$ formed upon them, as represented; the inclination of these cutters from the axis of rotation of the stock determining the requisite form of the mortises and tenons cut by the machine, which in the present case is frusto-conical, the outer edges of the cutters of course being always maintained concentric with the spindle-axis. The upper ends of these cutter-plates are united by an adjustable connection, which, in this instance, consists of a screw, $p$, passing through a slot, $e$, in one cutter, and screwed into its twin cutter, a third plate, $f$, provided with a scoring-point, $g$, for scoring the wood in advance of the cutter being interposed between the two cutter-plates, and being also formed with a slot for receiving the shank of the screw $p$, the said screw serving to clamp or fix the three plates together. As the cutting edges become worn, this screw may be loosened, and the cutters adjusted to the uniform gauge desired, and subsequently clamped in position. By the peculiar union of the dually-arranged cutters, the relative position of their lower ends may be varied in consonance with the variations of their cutting edges, in order to maintain a uniformity in the taper or outline of the cut made by them. By combining and arranging with them, as described, the pointer-plate $g$, I am enabled to vary its position, and the depth of the score made by it.

The object sought in making this improvement was partially accomplished in an invention for which Letters Patent of the United States, No. 55,661, were issued to me on the 19th day of June, 1866, as being in itself an improvement on the machine as patented by S. E. Hartwell on the 22d day of March, 1862. As shown in my patent of the above date, the cutting edges were formed upon one plate, and it will be evident that any deviation from the required size or taper of the cut made by them could not be rectified. In my present invention not only the size but the taper of the cut may be varied. I am enabled not only to maintain a uniform or given size or taper of cut, but to vary these if occasion requires.

What I claim, and desire to secure by Letters Patent, is—

A cutting tool, constructed and arranged for operation substantially as and for the purposes herein specified.

J. C. HURSELL.

Witnesses:
CHAS. H. GRIFFIN,
FREDERICK CURTIS.